(12) United States Patent
Duval-Arnould

(10) Patent No.: US 9,816,645 B2
(45) Date of Patent: Nov. 14, 2017

(54) GASKET WITH A CONSTANT SECTION

(71) Applicant: Ludovic Duval-Arnould, Chateau-Gontier (FR)

(72) Inventor: Ludovic Duval-Arnould, Chateau-Gontier (FR)

(73) Assignee: LE JOINT FRANCAIS SNC, Paris (FR)

( * ) Notice: Subject to any disclaimer, the term of this patent is extended or adjusted under 35 U.S.C. 154(b) by 0 days.

(21) Appl. No.: 15/291,885

(22) Filed: Oct. 12, 2016

(65) Prior Publication Data

US 2017/0102101 A1    Apr. 13, 2017

(30) Foreign Application Priority Data

Oct. 12, 2015  (FR) ...................................... 15 59667

(51) Int. Cl.
*F16L 21/025*   (2006.01)
*F16L 13/14*    (2006.01)

(52) U.S. Cl.
CPC ................................. *F16L 13/142* (2013.01)

(58) Field of Classification Search
CPC ......... F16L 21/00; F16L 21/02; F16L 21/025; F16L 21/03
See application file for complete search history.

(56) References Cited

U.S. PATENT DOCUMENTS

| 4,305,608 | A | * | 12/1981 | Stuemky | ............. | F16L 33/2076 |
| | | | | | | 285/256 |
| 7,401,791 | B2 | * | 7/2008 | Andrick | ................ | F16L 21/025 |
| | | | | | | 277/604 |
| 9,188,260 | B2 | * | 11/2015 | Spence | ................ | F16L 13/142 |

(Continued)

FOREIGN PATENT DOCUMENTS

| DE | 102012223903 A1 | 6/2014 |
| EP | 1277995 A1 | 1/2003 |

(Continued)

OTHER PUBLICATIONS

Rapport de Recherche Preliminaire / Opinion Ecrite, dated Aug. 18, 2016, issued in corresponding French Application No. 1559667, filed Oct. 12, 2015, 5 pages.

*Primary Examiner* — Gilbert Lee
(74) *Attorney, Agent, or Firm* — Christensen O'Connor Johnson Kindness PLLC

(57) ABSTRACT

An annular gasket intended to provide a tight assembly between a first and second pipe after crimping, including an axis of revolution, whereof a section parallel to said axis is a curve formed by a series of an odd number of circle segments $C_i$ connected by apices $S_i$ forming a regular polygon, i varying from 1 to $2*n+1$, n being a positive integer greater than or equal to 1, the apex $S_i$ being the center of the circle passing through the apices $S_{i+n}$ and $S_{i+n+1}$ modulo $2*n+1$. Such a curve is said to have a constant width. The apices $S_i$ advantageously form a polygon.

12 Claims, 5 Drawing Sheets

(56) References Cited

U.S. PATENT DOCUMENTS

2003/0102633 A1* 6/2003 Abiko .................. F16J 9/14
 277/529
2006/0226610 A1* 10/2006 Nakao .................. F02D 9/1035
 277/602

FOREIGN PATENT DOCUMENTS

EP 1637781 A1 3/2006
EP 2151616 A2 2/2010

* cited by examiner

GASKET WITH A CONSTANT SECTION

RELATED APPLICATIONS

The present application claims Paris Convention priority to French Application No. 1559667, filed Oct. 12, 2015, under 35 U.S.C. §119, and is hereby expressly incorporated by reference herein.

FIELD OF THE DISCLOSURE

Aspects of the invention relate to a sealing gasket, and in particular, to a gasket that ensures sealing after crimping of two pipes, for example, potable water pipes.

BACKGROUND

The water supply circuit in a building is generally made up of pipes connected to one another using press fittings provided with rubber gaskets. A press fitting is a fitting including a groove in which a gasket is located, installed to constitute a network, then deformed by pressing using a clamp suitable for performing crimping and making the fitting inseparable before water pressure is applied. Such an assembly therefore consists of inserting a pipe either around the fitting or inside the fitting. In the first case, the groove faces the outside of the fitting and the gasket is mounted, in the groove, over its inner diameter on the fitting. In the second case, the groove is turned toward the inside of the fitting and the gasket is mounted over its outer diameter in the fitting. The network can be made from metal pipes such as copper, cross-linked or non-cross-linked PE, single or multilayer, optionally with metal layer, etc.

In all cases, the sealing of the fitting is essential. Indeed, a building with several floors may contain hundreds or even thousands of fittings, and water damage may be very detrimental to the worksite or the building in use, these fittings often being placed in the walls or partitions and therefore being accessible.

Yet the insertion of the pipe may cause the gasket to rotate around itself, or cause it to leave the groove. The state of the art proposes means for stabilizing the gasket in the groove, for example a gasket whose axial section, which is then not circular, includes a portion with a larger curve radius, or even straight, this section being intended to be placed in the bottom of the groove. In this way, the gasket is "stabilized" in the bottom of the groove.

One drawback of this solution is that if the gasket nevertheless still rotates in the groove, it may either have a larger section and make the assembly harder, or have a smaller section and compromise the sealing.

SUMMARY OF THE DISCLOSURE

One or more aspects of the invention aim to resolve this problem. To that end, an embodiment of the inventive concepts disclosed herein proposes an annular gasket intended to provide a tight assembly between a first and second pipe after crimping, including an axis of revolution, whereof a section parallel to said axis is a curve formed by a series of an odd number of circle segments $C_i$ connected by apices $S_i$ forming a regular polygon, i varying from 1 to $2*n+1$, n being a positive integer greater than or equal to 1, the apex $S_i$ being the center of the circle passing through the apices $S_{i+n}$ and $S_{i+n+1}$ modulo $2*n+1$.

The apex refers to the angular point that connects two circle segments. Indeed, at this point, there is a slope discontinuity. Each apex $S_i$ is the center of the circle segment $C_i$ passing through the two apices furthest away from this apex. There are an odd number of apices $S_i$ and segments $C_i$. Modulo $2*n+1$ means that if the obtained number, for example n+i, is greater than $2*n+1$, one removes $2*n+1$ to obtain a result comprised between 1 and $2*n+1$. For example, if n=2 and i=4, n+i=6, namely, 1 modulo 5.

The curve formed by this section is, by construction, a curve with a constant section, or a curve with a constant width. Compared to a circular section with a same diameter, it is formed by circle segments with a larger curve radius than the circle.

Such a gasket advantageously, but not necessarily, has a circular section transverse to the axis, and may, for example, have an oval cross-section.

Such a gasket therefore has two advantages:
  Having a constant section, it does not risk causing the aforementioned problems if it rolls upon insertion of a pipe into the fitting.
  It has segments with a large curve radius that stabilize it at the bottom of the groove.

Advantageously, the regular polygon may be, for example, a pentagon.

The curve obtained in the case n=1 is the Reuleaux triangle. In the application to a gasket, however, case n=2 is preferable, the apices $S_i$ then being distributed over a regular pentagon.

Advantageously, the gasket may include a plane of symmetry.

In this case, the number of apices being odd, an apex $S_i$ is necessarily found in this plane of symmetry. The gasket, the surfaces which includes an "inner" portion facing the axis of revolution and an "outer" portion opposite the axis of revolution, may then have two embodiments:
  the "inner" portion includes the apex found in the plane of symmetry; in this case, the circle segment opposite this apex is located on the outer portion of the gasket and this gasket is suitable for a use in which the pipe is inserted inside the gasket;
  the "outer" portion includes the apex found in the plane of symmetry; in this case, the circle segment opposite this apex is found on the inner portion of the gasket and this gasket is suitable for a use in which the pipe is inserted outside the gasket.

Advantageously, the gasket may include, on its surface, a bead that extends radially and is made up of portions, said portions being separated by discontinuities forming tailraces before crimping.

Most of the fittings are designed to be tight as of assembly, i.e., before crimping. However, the sealing obtained without crimping is not perfect or lasting. Techniques and methodologies have therefore been developed to detect crimping flaws.

There are solutions making it possible to make a fitting that is not crimped able to escape, allowing a test action before commissioning in order to discover any non-crimped fittings ("Leak Before Press", or LBP, systems): the network is pressurized with air, and a pressure decrease indicates the presence of one or several non-crimped fittings. If the installation allows it, it is also possible to place the circuit under water pressure and determine whether a leak occurs.

These solutions are either visual (the fitting includes a plastic ring that is destroyed by the crimping action), or act through a particular geometry of the fitting (the fitting includes hollows in the groove, which are crushed upon crimping), or is based on a particular geometry of the seal.

Seals are, for example, used that have a local reduction in the section of the gasket, O-ring or special shape (oval, with lip, triangular, etc.), causing the gasket not to be tight as long as the gasket is not crimped, due to an absence of crushing of said section and therefore of contact. The narrower section is sometimes surrounded by bulges or blisters to accentuate the loss of contact effect. One drawback of this solution by local reduction in the section lies in the fact that once the fitting is crimped, the tightness is produced at the locations of the reductions by a reduced section, and is therefore much less robust and lasting.

Another solution consists of creating a local increase in the section of the gasket. In this case, this excess thickness creates the leak on its sides before pressing.

In one proposed solution, the gasket includes a bead that extends radially from its surface, the radial direction being counted from the center O of the curve that forms the section of the gasket, i.e., from the center of the circumscribed circle. This bead is intended to move the surface of the gasket away from that of the first or second pipe and to create leaks as long as the gasket is not crimped. Since this bead includes segments separated by discontinuities, the latter create leak channels that are quite individualized before crimping of the assembly. The bead segments occupy a substantial portion of the circumference on which it is found.

Such a gasket with a bead may have two embodiments:
the bead may extend from a circle segment, for example the circle segment intersecting the plane of symmetry and therefore intended to be placed in the bottom of the groove,
the bead may extend from an apex.

Advantageously, the bead may extend in the plane of symmetry of the gasket.

Advantageously, the height of the bead relative to the surface of the gasket is less than 20% of the radius of the circumscribed circle at the section of the gasket, preferably less than 10% of the radius of the circumscribed circle.

Advantageously, the bead may include from 2 to 10 portions.

DESCRIPTION OF THE DRAWINGS

Embodiments and alternatives will be described below, as non-limiting examples, in reference to the appended drawings, in which.

DETAILED DESCRIPTION

Figure 1:
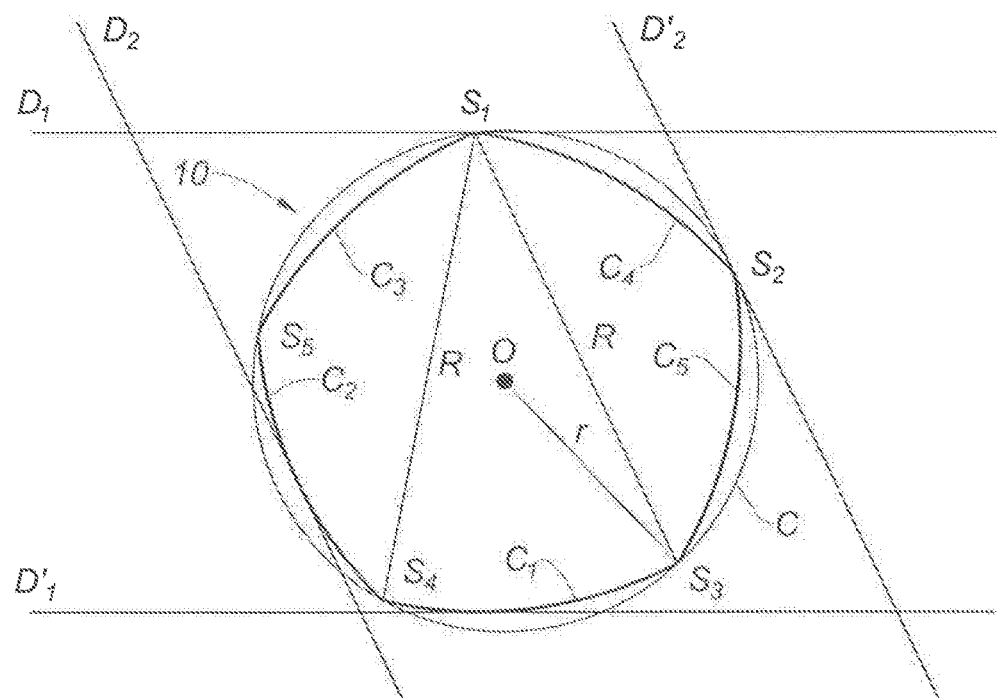
FIG. 1 shows a curve with a constant section (or constant width).

The closed curve 10 of FIG. 1 is built based on the apices $S_1$ to $S_5$ of a regular pentagon; one is therefore in the case where n=2. Between the apices, arc of circle segments $C_1$ to $C_5$ extend, with radius R. Each apex $S_i$ is the center of the circle segment $C_i$ furthest from the apex $S_i$ on this curve, between the apices $S_{i+n}$ and $S_{i+n+1}$. For example, the segment $C_1$ opposite the apex $S_1$ extends between the apices $S_3$ and $S_4$. A curve with a constant width refers to a closed planar curve whereof the width, measured by the distance between two opposite parallel straight lines that are tangent to it, is the same irrespective of the orientation of these lines. As illustrated in FIG. 1, in the case of parallel straight lines D1, D'1 or D2, D'2, one will always pass through an apex $S_i$ and the other will be tangent to the opposite circle segment $C_i$. As a result, the distance between two such straight lines will always be equal to R, irrespective of their orientation.

The pentagon is inscribed in a circle C with center O and radius r (partially drawn). One can see that the radius R of the segments $C_i$ is significantly larger than the radius r of the circumscribed circle.

Figure 2A:
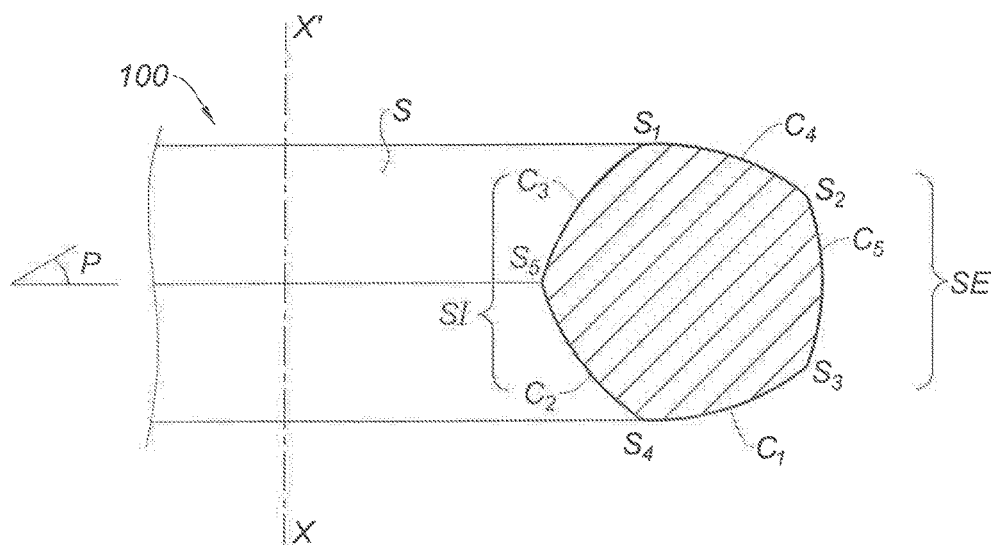
FIGS. 2A and 2B show gaskets whereof the section is a curve with a constant section bearing on a regular pentagon.
Figure 2B:
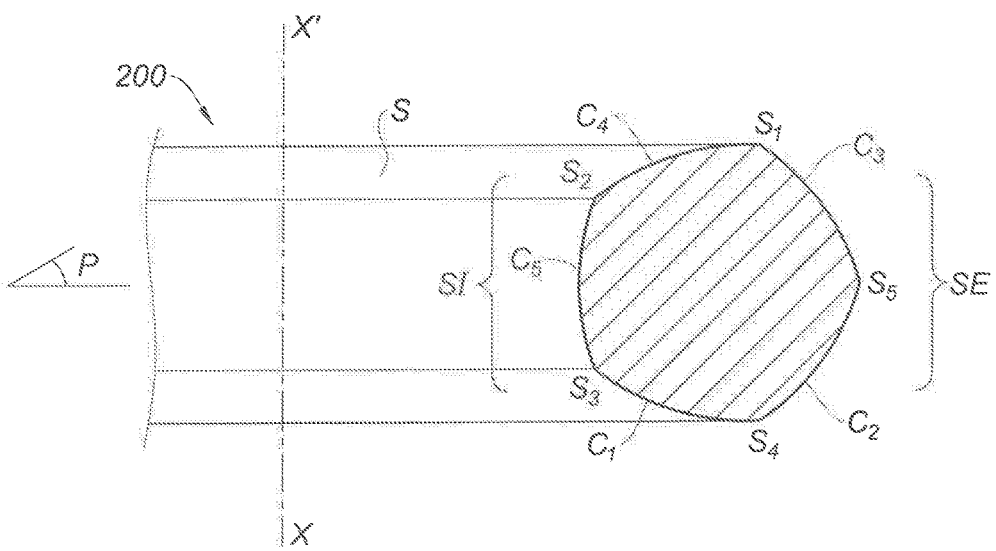

FIGS. 2A and 2B illustrate gaskets 100, 200 including an axis of revolution X-X' and whereof a section parallel to this axis is a curve similar to that of FIG. 1.

The gaskets illustrated in FIGS. 2A and 2B include a plane of symmetry P.

As illustrated in FIG. 2A, it is possible to define an inner portion SI of the surface S of the gasket 100, turned toward the axis X-X', here including the segments $C_2$ and $C_3$, and an outer portion SE of the surface S of the gasket opposite the axis X-X', here including the segments $C_1$, $C_4$ and $C_5$. The apex $S_5$ is situated in the plane of symmetry P of the gasket 100 and on the inner portion SI of the gasket 100. Conversely, the segment $C_5$ intersects the plane of symmetry and is situated on the outer portion SE of the gasket. The segment $C_5$ is provided to be placed in a fitting groove to be crimped. Consequently, the gasket 100 is suitable for insertion through the inside of the gasket.

In the gasket 200 illustrated in FIG. 2B, however, the apex $S_5$ this time is situated on the outer portion SE of the surface S of the gasket that includes the segments $C_2$ and $C_3$, the inner portion SI of the surface S of the gasket including the segments $C_1$, $C_4$ and $C_5$. As before, the segment $C_5$ is provided to be placed in a fitting groove to be crimped, but this time it is on the inner portion SI of the gasket. Consequently, the gasket 200 is suitable for insertion through the outside of the gasket.

As shown in the context of FIG. 1, the segments $C_i$ have a curve radius R larger than that of a gasket with a circumscribed circular section at the polygon, such that such a gasket 100, 200 is more stable than a gasket with a circular section when a segment $C_i$ is found in the bottom of a groove.

Figure 3:
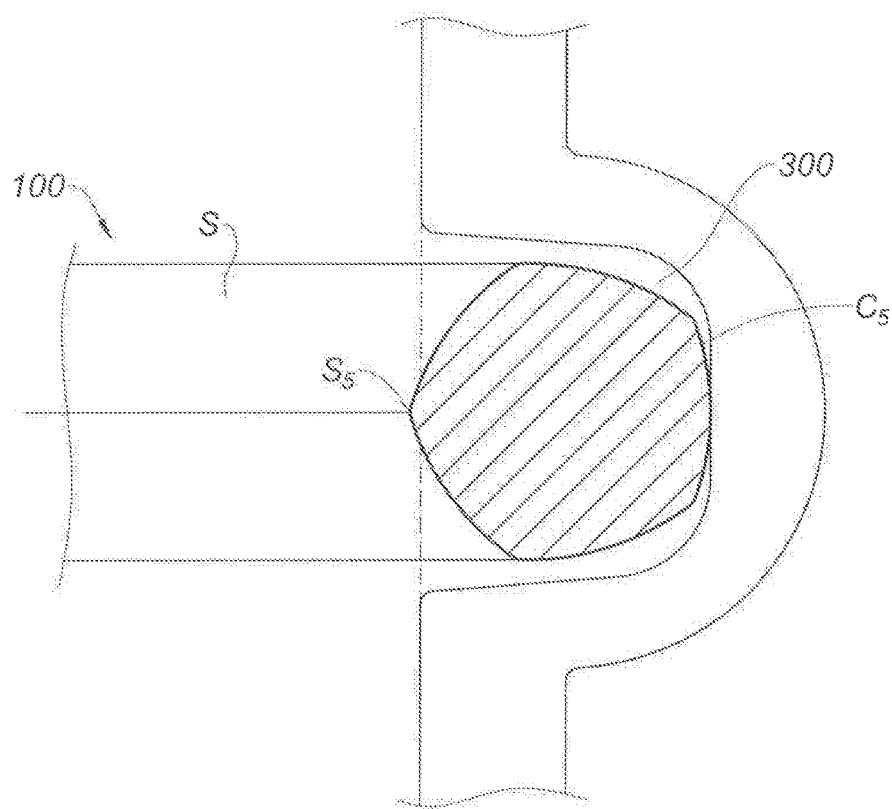
FIG. 3 illustrates a gasket placed in a fitting groove to be crimped.

FIG. 3 illustrates this situation: the gasket 100 is found in a gasket groove 300 to be crimped, the segment $C_5$ being in the bottom of a groove and stabilizing the gasket.

The examination of FIG. 1 also shows that with an identical width, as defined in relation to FIG. 1, such a gasket 100, 200 includes less material than a gasket with a circular section.

Such a gasket will be referred to hereinafter as a pentagonal gasket.

Finite element calculations have been done to compare the behavior of two gaskets made up of a same material (shore hardness: 65 ShA), a gasket with a circular section and a pentagonal gasket, with a same width as defined in relation to FIG. 1. The gaskets are placed in a groove with a substantially square or rectangular section; one wall of this groove forming a tool is mobile and compresses the gasket radially. The force is measured as a function of the movement of the tool.

Figure 4:
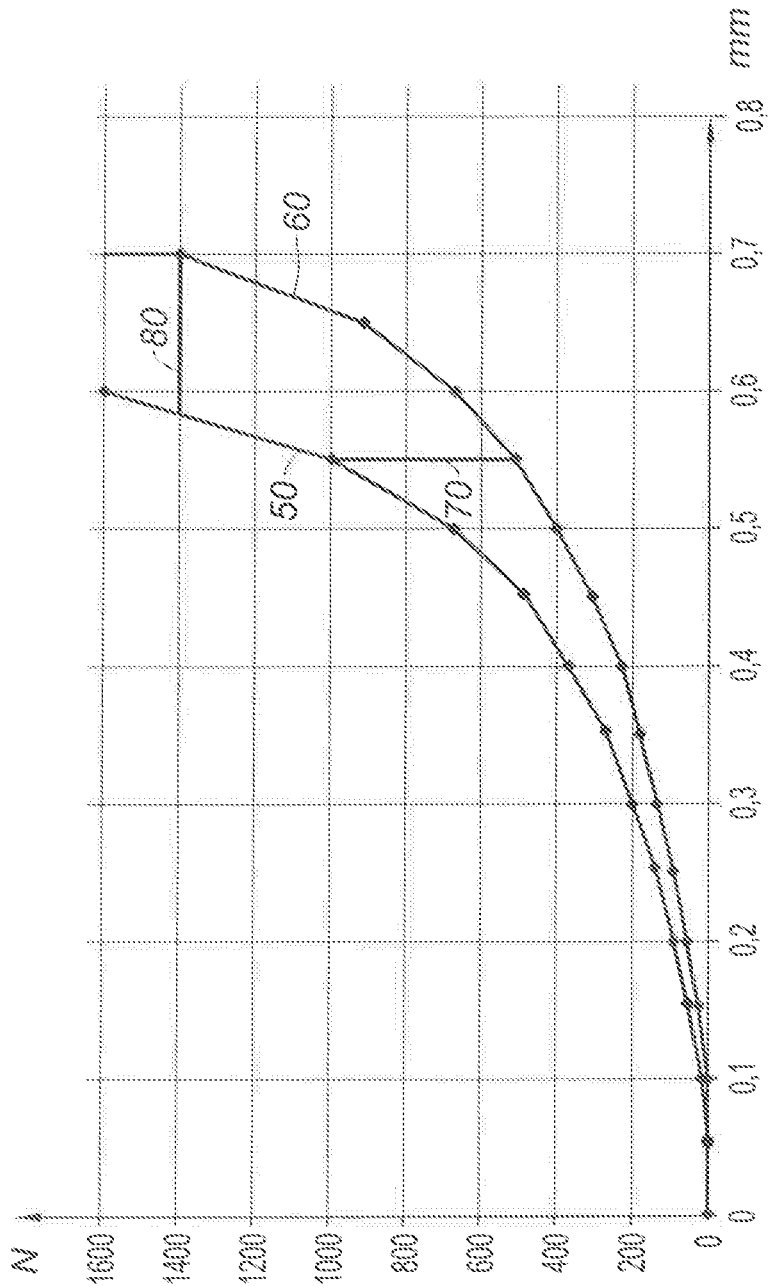
FIG. 4 shows the variation of the compression force based on the movement of a tool for two annular gaskets, a gasket with a circular section and a gasket according to the invention.

FIG. 4 is a graph including variation curves of the force in Newtons based on the movement of the tool in mm for such gaskets, curve 50 for the pentagonal gasket and curve 60 for the gasket with a circular section. One can see that the pentagonal gasket better withstands the confinement than the gasket with a circular section:

For example, the straight line segment 70 shows that with a movement of the tool of 0.55 mm, there is a corresponding force of about 1000 N for the gasket with a circular section and only about 500 N for the polygonal gasket;

The straight line segment 80 shows that a force of 1400 N makes it possible to obtain a movement of about 0.57 mm for the gasket with a circular section and 0.7 mm for the pentagonal gasket.

The pentagonal gasket has a better resistance to confinement, defined as the stress applied by the walls of the groove in the axial direction for the gasket. This case may occur through unfavorable play of the allowances. The pentagonal gasket offers better tolerance. This is a significant advantage relative to the gasket with a circular section. Indeed, upon crimping, the gaskets are mechanically stressed, and if the stress is excessive, there is a risk of total or partial break, and therefore a risk of leak.

Figure 5:
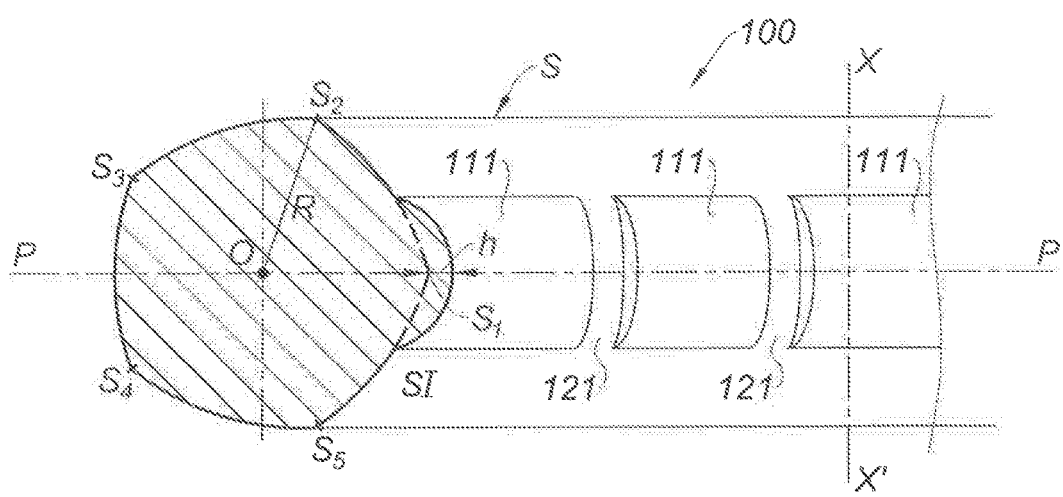
FIG. 5 shows the gasket of FIG. 2A also including an interrupted bead.

FIG. 5 illustrates a cross-section of another embodiment of the gasket 100. In this embodiment, the gasket includes, on its surface 8, a discontinuous bead made up of segments 111 separated by channels 121. As shown in FIG. 5, the bead is found on the inner portion SI of the surface S of the gasket 100 and in the plane of symmetry P of the gasket 100. It rises to a height h above the apex $S_1$ of the pentagonal gasket. It could, of course, extend from the outer portion SE of the surface S of the gasket and/or from a circle segment $C_1$ (not shown).

The cross-section of the bead illustrated in FIG. 5 has a lunula shape, i.e., it is defined by a circle with a radius much smaller than the radius R of the circle segments $C_i$. The height h of the lunula must be sufficient for leaks to occur in the channels 121 before crimping, but not excessive so that the bead segments indeed withdraw by elasticity after crimping. In the illustrated case, the ratio between the height h of the lunula and the diameter (this diameter being equal to 2*r) of the circumscribed circle C at the section of the joint is equal to 0.1/1=10%. More generally, it is established that the ratio h/2*r is preferably comprised between 10% and 20% (to facilitate understanding, the lunula of FIG. 5 is enlarged). For example, in absolute value, for gaskets with a section (or diameter) from 1.50 mm to 5 mm, the height h of the bead may be from 0.10 mm to 0.30 mm.

Embodiments of the invention are not limited by the preceding description. It in particular relates to:

Other curve shapes with a constant width, for example based on a triangle (n=1) or a heptagon (n=3), Asymmetrical gaskets, i.e., not having symmetry, Beads that do not extend in the plane of symmetry of the gasket but, for example, in a plane parallel to the plane of symmetry, or that form a helix around the gasket, Bead shapes other than the lunula, for example, a basket handle, or a combination of curves and straight segments, inasmuch as the bead is not continuous.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An annular gasket intended to provide a tight assembly between a first and second pipe after crimping, including an axis of revolution (X-X'), whereof a section parallel to said axis is a curve formed by a series of an odd number of circle segments $C_i$ connected by apices $S_i$ forming a regular polygon, i varying from 1 to 2*n+1, n being a positive integer greater than or equal to 1, the apex $S_i$ being the center of the circle passing through the apices $S_{i+n}$ and $S_{i+n+1}$ modulo 2*n+1.

2. The gasket according to claim 1, wherein the regular polygon is a pentagon.

3. The gasket according to claim 1, which includes a plane of symmetry (P).

4. The gasket according to claim 3, whereof the surface includes an inner portion (SI) facing the axis of revolution (X-X') and an outer portion (SE) opposite the axis of revolution, wherein the inner portion includes the apex $S_i$ found in the plane of symmetry (P).

5. The gasket according to claim 3, whereof the surface includes an inner portion (SI) facing the axis of revolution (X-X') and an outer portion (SE) opposite the axis of revolution, wherein the outer portion includes the apex found in the plane of symmetry (P).

6. The gasket according to claim 3, wherein the bead extends in the plane of symmetry (P) of the gasket.

7. The gasket according to claim 1, which includes, on its surface (S), a bead that extends radially and is made up of portions, said portions being separated by discontinuities forming tailraces before crimping.

8. The gasket according to claim 7, wherein the bead extends from a circle segment ($C_i$).

9. The gasket according to claim 7, wherein the bead extends from an apex ($S_i$).

10. The gasket according to claim 7, wherein the height (h) of the bead relative to the surface (S) of the gasket is less than 20% of the diameter of the circumscribed circle at the section of the gasket.

11. The gasket according to claim 7, wherein the bead includes from 2 to 10 portions.

12. The gasket according to claim 7, wherein the height (h) of the bead relative to the surface (S) of the gasket is less than 10% of the radius of the circumscribed circle at the section of the gasket.

* * * * *